United States Patent [19]

Sender

[11] 4,044,886
[45] Aug. 30, 1977

[54] SYSTEM FOR HANDLING STRUCTURAL MEMBERS

[76] Inventor: Wilfred E. Sender, 742 Cooper Ave., Johnstown, Pa. 15906

[21] Appl. No.: 644,564

[22] Filed: Dec. 29, 1975

[51] Int. Cl.² .............................................. B65G 47/54
[52] U.S. Cl. ...................................... 198/488; 198/750; 198/774; 214/1 BB
[58] Field of Search ............... 198/107, 218, 219, 750, 198/773, 774, 775, 487, 488; 214/1 BB

[56] References Cited

U.S. PATENT DOCUMENTS

| | | | |
|---|---|---|---|
| 1,601,959 | 10/1926 | George et al. .................. | 198/107 X |
| 1,671,534 | 5/1928 | Lockhart ........................... | 198/107 |
| 2,954,863 | 10/1960 | Staples, Jr. ...................... | 198/219 X |
| 3,113,767 | 12/1963 | Halberstadt ...................... | 214/1 BB |
| 3,416,646 | 12/1968 | Boos et al. ........................ | 198/219 |
| 3,512,628 | 5/1970 | Keough ............................. | 198/219 |
| 3,565,241 | 2/1971 | Race et al. ....................... | 198/219 |
| 3,581,880 | 6/1970 | Iversen ............................. | 198/219 |
| 3,731,790 | 5/1973 | Esser et al. ...................... | 198/219 |
| 3,767,064 | 10/1973 | Lutz ................................ | 198/219 X |
| 3,777,916 | 12/1973 | Lutz ................................ | 198/107 X |
| 3,917,078 | 11/1975 | Schmidt ........................... | 198/82 X |

*Primary Examiner*—Evon C. Blunk
*Assistant Examiner*—Richard K. Thomson

[57] ABSTRACT

A conveyor system for moving structural steel beams and the like to a saw made up of a first conveyor for moving the beams to the saw and the second spaced conveyor members connected to the first conveyor at right angles thereto and a lifting and moving mechanism on second conveyor for lifting beams laid on second conveyor, moving them onto the first conveyor and lowering them onto the first conveyor.

4 Claims, 4 Drawing Figures

SYSTEM FOR HANDLING STRUCTURAL MEMBERS

OBJECTS OF THE INVENTION

It is an object of the invention to provide an improved loader for a roller conveyor.

Another object of the invention is to provide an improved loader for a roller conveyor that is simple in construction, economical to manufacture and simple and efficient to use.

Another object of the invention is to provide an improved loader of a conveyor and the like.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF THE DRAWINGS

Figure 1:
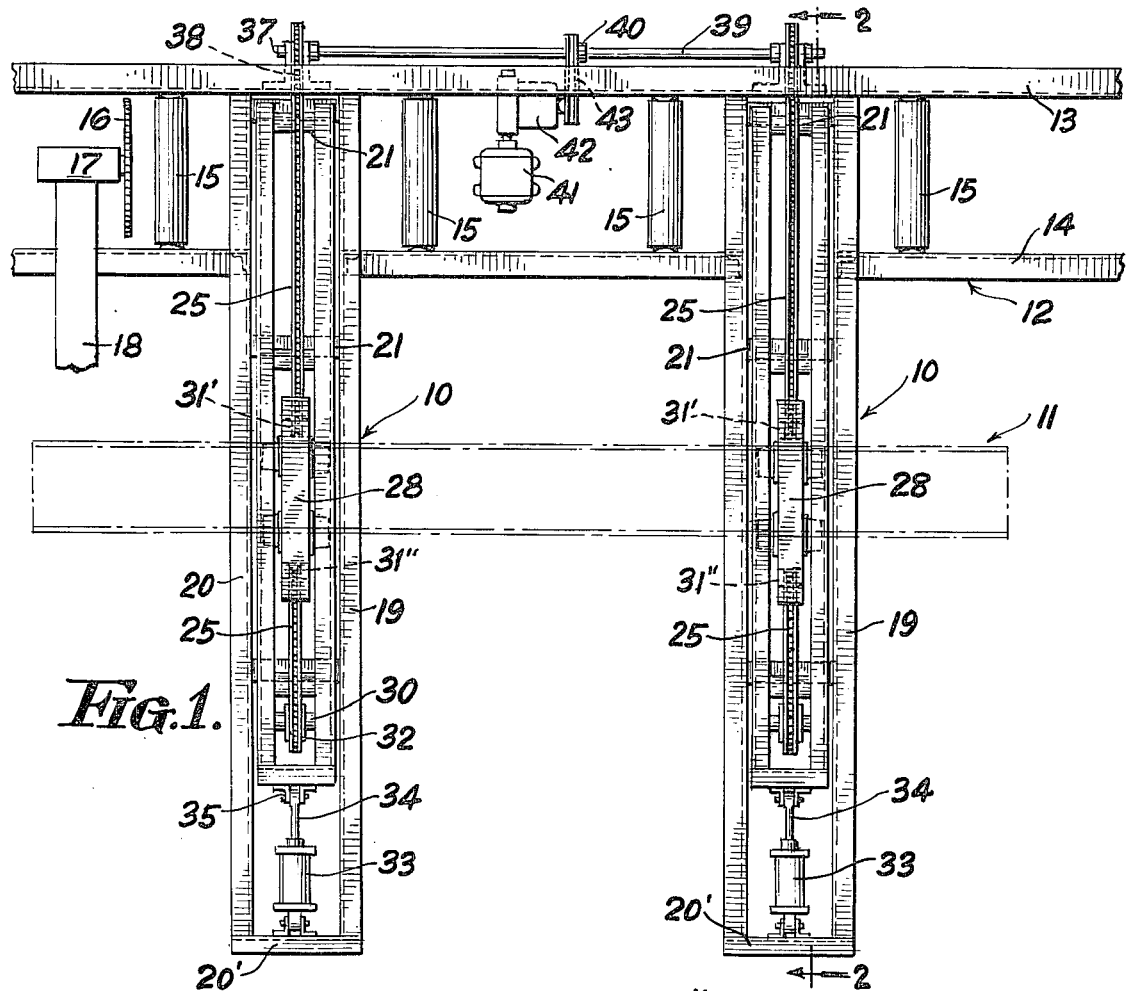
FIG. 1 is a top view of the loading device in combination with a roller conveyor according to the invention.
Figure 2:
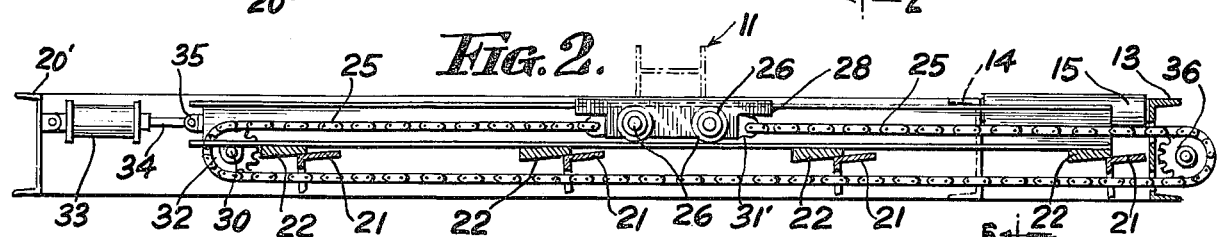
FIG. 2 is a cross-sectional view taken on Line 2—2 of FIG. 1.
Figure 3:
FIG. 3 is a view similar to FIG. 2 showing the trolley track lifted.
Figure 5:
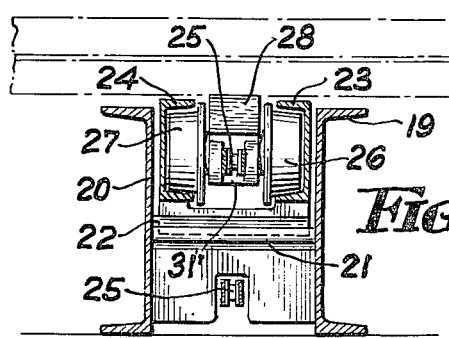
FIG. 5 is an enlarged view similar to FIG. 4 showing a longitudinal cross-sectional view of the trolley.
Figure 4:
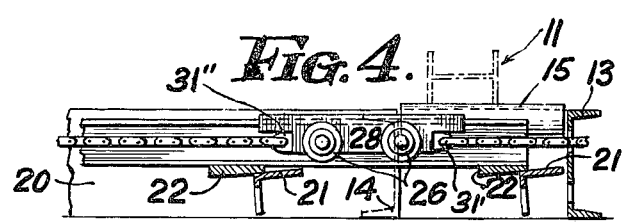
FIG. 4 is an enlarged partial view showing the trolley track lowered.

Now, with more particular reference to the drawings, the loading or first conveyor 10 for loading an I-beam or other elongated structural member indicated generally at 11 onto a second roller conveyor or the like indicated at 12.

The roller conveyor has side rails 13 and 14 supported in spaced relation to each other and spaced rollers 15 are supported between side rails 13 and 14 of the roller conveyor.

The roller conveyor is of a type familiar to those skilled in the art and is intended to carry steel beams, such as the I-beam 11, up to the saw 16 which may be a circular saw driven by a motor 17 supported on a base 18 of the type familiar to those skilled in the art.

The first conveyors 10 are each made up of frame means each having two laterally-spaced channels 19 and 20 held in rigid fixed relation to each other by the laterally-extending channels 20' which hold the channels 19 and 20 in rigid, spaced relationship with each other. The channels 19 and 20 are disposed perpendicular to the direction of travel of the second roller conveyor 12 and the end of the channels 19 and 20 may rest on top of the channels 13 and 14 of the roller conveyor 12.

Spaced angle members 21 are fixed to the large channel members 19 and 20 and extend therebetween. The angles 21 have an upwardly-facing, inclined top surface that slidably engages wedges 22 that are fixed to the small channel track members 23 and 24. The angle members 21 are recessed at their central part to receive the chain 25.

A channel track made up of the channel members 23 and 24 receive car wheels 26 and 27 between them. The car wheels are fixed to the car having front and rear wheels 26 on one side and front and rear wheels 27 on the other side. The car has a load-supporting member 28 that lifts the I-beam 11 which is to be loaded onto the roller conveyor to rolls 15. The ends of the chain 25 are fixed to the load-supporting member 28 at 31' and 31". The chains 25 are supported on sprockets 32 at the end remote from the roller conveyor which sprockets are carried on axles 33 which are supported between the ends of the small channel members 23 and 24 remoted from the conveyor. Hydraulic cylinders 33 are pivoted to the frame 22 and hydraulic cylinders 33 contain a piston having rods 34 that is connected to the small channels 23 and 24 at 35 to move the tracks containing channels 23 and 24 toward and away from the roller conveyor thereby raising it and lowering it.

The end of the chain 25 adjacent the roller conveyor is supported on the sprocket 36 which is supported on an axle 39 having an end 37 carried in pillow box 38 on the small channels 23 and 24. The sprockets 36 are connected to the axle 39 which extends between the sprockets and carries a drive sprocket 40 which is driven by a gear motor 41 through a gear reducer 42 and through small chain 43.

When it is desired to use the apparatus disclosed in this application, the trolley having load-supporting member 28 thereon will be driven to a position remote from the roller conveyor and the I-beam will be loaded onto the channel members 19 and 20. The motor 41 will then drive the chains 25 to bring the load-supporting member 28 directly below the beam 11. The hydraulic cylinders 33 will then be actuated, pushing the channels 23 and 24 toward the roller conveyor and causing the wedges 22 to slide upward on the upper surface of the angles 21 thereby lifting the trolley member and the I-beam with it. The hydraulic cylinder 33 will then retract the piston rod 34, thereby lowering the I-beam 11 onto the rollers 15. The I-beam then can be positioned properly relative to the saw 18 and the saw can be moved out of the way until the I-beam is in place before it is moved forward for sawing off the end of the I-beam.

The foregoing specification sets forth the invention in it spreferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A conveyor system for moving elongated structural members to a saw adjacent a roller conveyor comprising,
    a roller conveyor having spaced rollers with an axis of rotation disposed perpendicular to the direction of travel of said roller conveyor,
    spaced conveyor members disposed transversely of the direction of travel of said roller conveyor and supported adjacent said roller conveyor,
    each said conveyor member comprising,
    two large spaced channel members having their webs adjacent to each other and disposed in parallel planes with the flanges of said large channels extending away from each other, the top surface of each said large channel member being disposed below a plane passing through the top of the rollers of said roller conveyor, spaced angle members fixed to the lower flanges of said large channel members and extending therebetween, each said angle member having a top surface inclined upwardly and in a direction toward said roller conveyor, two spaced small channel members disposed between said large channel members and having their flanges extending toward each other and defining a space therebetween, a car having a load supporting member disposed in said space between said small channel members, at least one car wheel on each said of said car, each said car wheel being disposed in the space between the flanges of a said small channel member, and making rolling engagement with the upper side of the lower flange of each said small channel member, spaced cams fixed to the lower sides of said small channel members and resting on said top surface of said angle members, a hydraulic cylinder having a piston rod, said hydraulic cylinder and piston rod being connected between said large channel members and said small channel members for moving said small channel members axially between said large channel members whereby said cam surfaces move up and down along said inclined surfaces and said small channel members are moved upwardly in translation relative to said large channel members whereby the top of said car is moved above the level of said rollers and may be moved down, two spaced sprocket members, each said sprocket member being supported on an axle extending between said small channel members and supported on said small channel members, a chain supported on said sprocket members, said chain being connected to said car between the adjacent ends of the flanges of said small channel members and motor means driving said chain for moving said car along said small channel members, said hydraulic cylinder being adapted to move said small channel members axially relative to said large channel members whereby said car is lifted by said cam to bring the top surface thereof above said large channel members whereby an article supported on said large channel members will be lifted by said car from said large channel members and may be moved toward said roller conveyor by said motor means through said chain.

2. The conveyor system recited in claim 1 wherein said motor means is supported on said roller conveyor and a shaft supported on said roller conveyor extends parallel to the direction of travel of said roller conveyor and is connected to said motor, each end of said shaft has a sprocket thereon engaging a said chain on a said conveyor member for moving said car toward and away from said roller conveyor.

3. The system recited in claim 2 wherein said car has two said wheels on each side thereof.

4. The system recited in claim 1 wherein said chain has ends connected to said car.

* * * * *